United States Patent [19]

Wacek et al.

[11] Patent Number: 4,800,312
[45] Date of Patent: Jan. 24, 1989

[54] MOUNTING FOR BRUSHES OF ELECTRIC MOTORS

[75] Inventors: Rudolph W. Wacek, Montoursville; R. Lent Crevling, Jr., Williamsport, both of Pa.

[73] Assignee: Shop-Vac Corporation, Williamsport, Pa.

[21] Appl. No.: 53,147

[22] Filed: May 21, 1987

[51] Int. Cl.⁴ .............................................. H02K 13/00
[52] U.S. Cl. ..................................... 310/239; 310/42; 310/71; 310/244; 29/596
[58] Field of Search ..................... 310/89, 92, 90, 239, 310/240, 43, 45, 241, 242, 244, 245, 246, 247, 248, 249, 71, 229, 230, 597

[56] References Cited

U.S. PATENT DOCUMENTS

| | | | |
|---|---|---|---|
| 2,345,428 | 3/1944 | Rhoads | 310/244 |
| 2,345,429 | 3/1944 | Hanna | 310/244 |
| 2,753,477 | 7/1956 | Yahn | 310/239 |
| 3,226,585 | 12/1965 | Roe | 310/239 |
| 3,308,321 | 3/1967 | Provost, Jr. | 310/245 |
| 3,523,288 | 8/1970 | Thompson | 310/239 |
| 3,603,824 | 9/1971 | Csaki | 310/239 |
| 3,656,016 | 4/1972 | Jacyno | 310/239 |
| 3,710,159 | 1/1973 | Dupuis | 310/239 |
| 4,166,968 | 9/1979 | Prittie | 310/239 |
| 4,190,781 | 2/1980 | Sauerwein | 310/239 |

FOREIGN PATENT DOCUMENTS

| | | | |
|---|---|---|---|
| 0638216 | 3/1962 | Canada | 310/239 |
| 8105109 | 6/1983 | Netherlands | 310/239 |

Primary Examiner—R. Skudy
Attorney, Agent, or Firm—Ostrolenk, Faber, Gerb & Soffen

[57] ABSTRACT

A small electric motor includes a wound rotor or armature, a segmented commutator and brushes biased lengthwise against the commutator for providing a circuit through which the armature is energized. Each brush is part of an assembly that also includes a conducting brush tube from which the brush extends, and an insulating tube in which the brush tube is frictionally held. Aligned pivot projections extend transversely from opposite sides of the insulating tube and are received by recesses in the motor frame. The recess walls provide bearing formations that are engaged by the pivot projections to cooperate therewith so that during mounting of the insulating tube and elements assembled therewith, the insulating tube is pivoted from an oblique intermediate position to a final operating position. A single screw threadably engaged in the motor frame locks the insulating tube in this final operating position. Tightening of this screw generates a wedging action that stabilizes the insulating tube in its final operating position.

16 Claims, 8 Drawing Sheets

MOUNTING FOR BRUSHES OF ELECTRIC MOTORS

BACKGROUND OF THE INVENTION

This invention relates to small electric motors in general and more particularly relates to means for mounting the brushes thereof.

Vacuum cleaners, hand held power tools, and other small electrically powered devices are often provided with motors having wound rotors that are energized through circuits that include carbon brushes which engage a commutator mounted on the rotor. It appears that the costs of brush mounting elements and costs of assembling these elements with other motor elements is relatively high in relation to the overall cost of the motor.

Examples of prior art brush mountings in small motors are found in U.S. Pat. No. 3,226,585 issued to E. O. Roe for Dynamo-Electric Machine Coil Retaining Means, U.S. Pat. No. 3,523,288 issued to H. A. Thompson for Brush Wear Indicator, U.S. Pat. No. 3,603,824 issued to J. Csaki for Wiring Harness for Electrical Rotary Machines, U.S. Pat. No. 3,656,016 issued to A. Jacyno and H. Botefuhr for Subframe For Power Tool Having Double Insulated Brush Holders, and U.S. Pat. No. 3,710,159 issued to M. V. Dupuis and J. R. Greer for Electric Brush and Lead Holder. An examination of the aforesaid patents indicates that in the area of brush holder constructions and mountings, the number of elements are excessive, expensive elements are required and/or assembly of these elements is unnecessarily complicated and/or costly.

SUMMARY OF THE INVENTION

In accordance with the instant invention, a brush of generally rectangular cross section is fitted in a brush tube that contains a spring which biases the brush so that part of it projects beyond an open end of the brush tube. A Terminal formed integrally with the brush tube permits the brush to be connected to an external circuit. A flexible conductor disposed within the brush tube has one end connected to the brush and the other end is connected to the brush tube at the end thereof remote from the opening through which the brush projects, with the length of the conductor being such that a portion of the brush is within the brush tube. The brush tube is frictionally held within an insulating tube having aligned transverse projections which constitute bearing means that is guided into engagement with bearing formations formed in the stationary frame of the motor. The brush, brush tube, insulating tube, biasing spring and flexible conductor constitute a brush-holder assembly.

After initial engagement between the bearing means and bearing formations, the brush-holder assembly is pivoted about an axis defined by the bearing formations until reaching a final operating position in which the longitudinal axis of the assembly is generally perpendicular to the rotational axis of the rotor. The brush-holder assembly is held in its operating position by a single screw that is threadably mounted to the motor frame, with the head of the screw being in locking position with respect to a transverse projection of the insulating tube. The bearing means is located relatively close to the end of the insulating tube from which the brush projects and the projection is located between the bearing means and the other end of the insulating tube.

OBJECTS OF THE INVENTION

Accordingly, the primary object of the instant invention is to provide a relatively inexpensive means for mounting the brushes of a small electric motor.

Another object is to provide brush holding means that is relatively simple to assemble.

Still another object is to provide brush holder means of this type which contributes to reliable motor operation over an extensive period of time.

A still further object is to provide brush holder means of this type that is held in its final operating position by a single screw.

BRIEF DESCRIPTION OF THE DRAWINGS

These objects as well as other objects of this invention shall become readily apparent after reading the following description of the accompanying drawings, in which.

DETAILED DESCRIPTION OF THE PREFERRED EMBODIMENT

Figure 1:
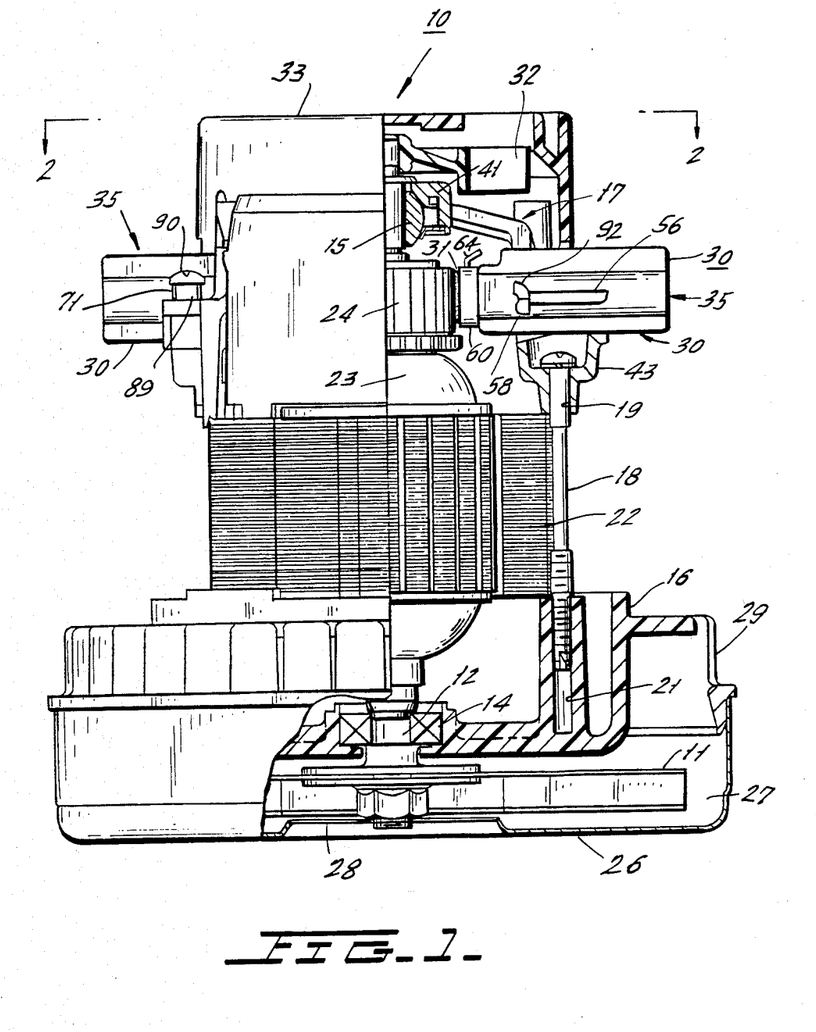
FIG. 1 is a partially sectioned side elevation of a motor-blower for a vacuum cleaner, in which an impeller is powered by a small electric motor having brush holder means constructed in accordance with teachings of the instant invention.
Figure 2:
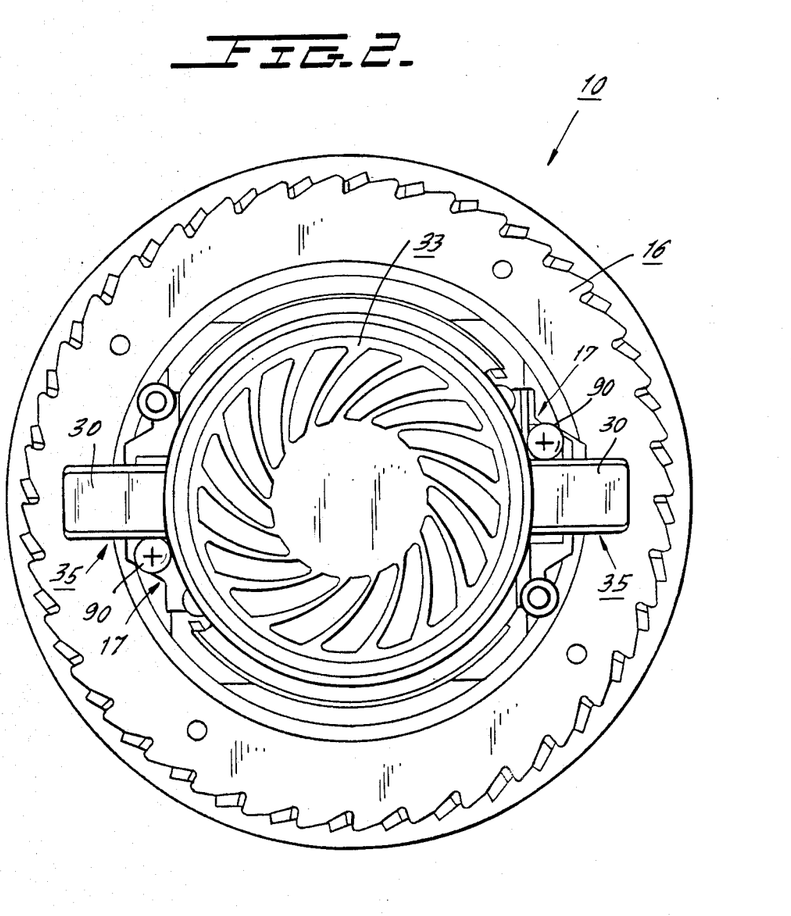
FIG. 2 is a plan view of the motor blower looking in the direction of arrows 2—2 of FIG. 1.
Figure 5:
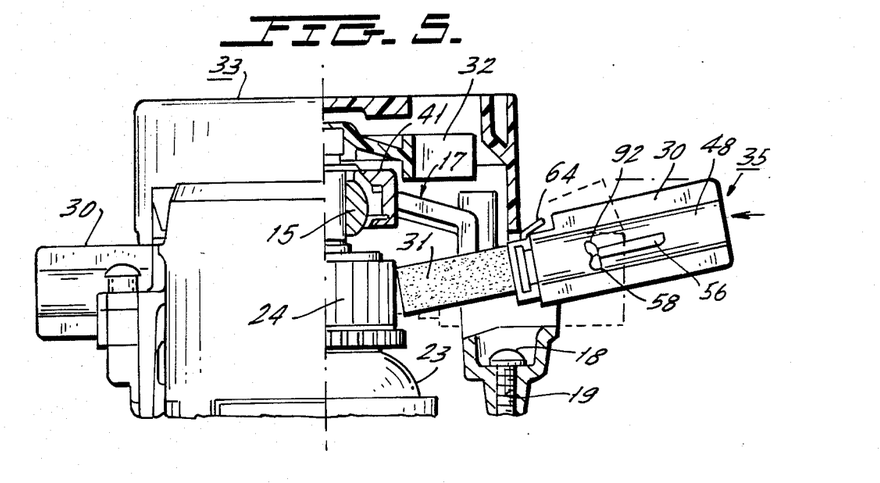
FIG. 5 is a fragmentary portion of FIG. 1 showing the brush-holder assembly at an intermediate position during the mounting thereof to the spider.

Now referring to the Figures and FIG. 1 in particular that illustrates motor-blower 10 which is of a type utilized to generate suction is a so-called bypass type vacuum cleaner. More particularly, motor-blower 10 includes pancake type impeller 11 secured to the lower end of motor shaft 12 that is rotatably supported by lower and upper bearings 14, 15 which in turn are mounted to the end portions of housing 16 and spider 17. Studs 18 extend through clearance apertures 19 (FIG. 5) in spider 17 and are threadably received in cavities 21 of housing 16 to clamp field stack 22 between housing 16 and spider 17. The assembly of spider 17, housing 16 and stack 22 constitutes a stationary motor frame. Armature 23 on shaft 12 is disposed within the central opening of stack 22, and commutator 24 mounted on shaft 12 is disposed between the upper end of armature 23 and upper bearing 15.

Cover 26, snap fitted to the bottom of housing 16, cooperates therewith to form shallow chamber 27 wherein impeller 11 is disposed for rotation in a direction that draws air upward through central aperture 28 in cover 26. Such air travels radially outward through chamber 27 where it is deflected upward through apertures 29 near the periphery of chamber 27.

Figure 11:
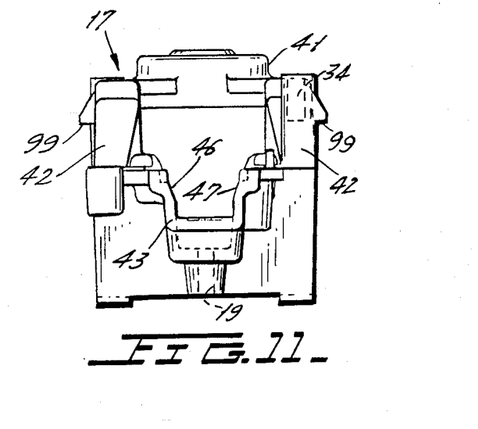
Figure 12:
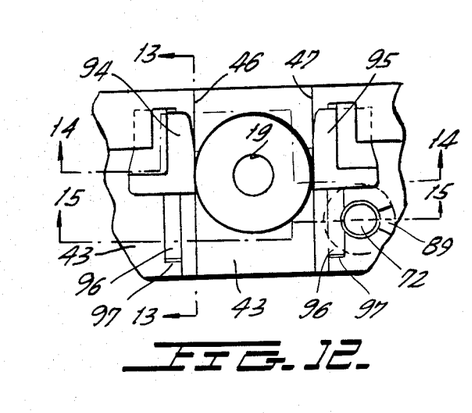
FIG. 12 is an enlarged view of the spider portion within enclosure A of FIG. 8.
Figure 13:
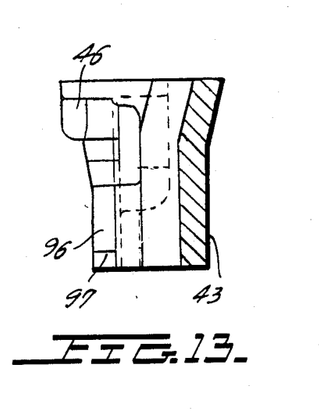
FIGS. 13, 14 and 15 are cross sections of the spider portion in FIG. 12 taken through the respective lines 13—13, 14—14 and 15—15 looking in the directions of the respective arrows 13—13, 14—14 and 15—15.
Figure 14:
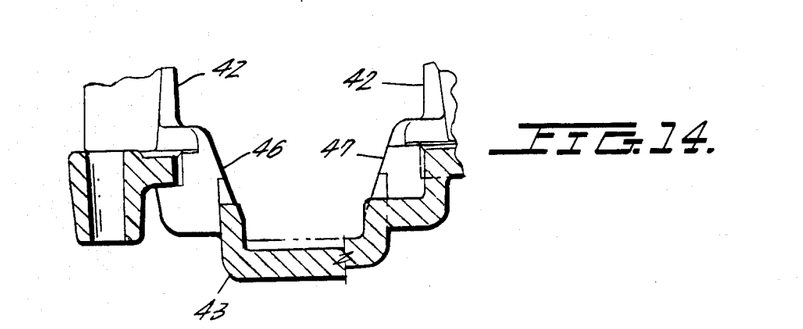
Figure 15:
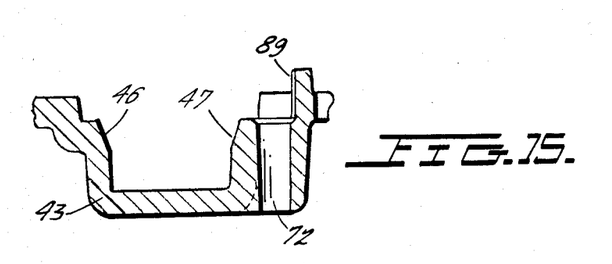
Figure 16:
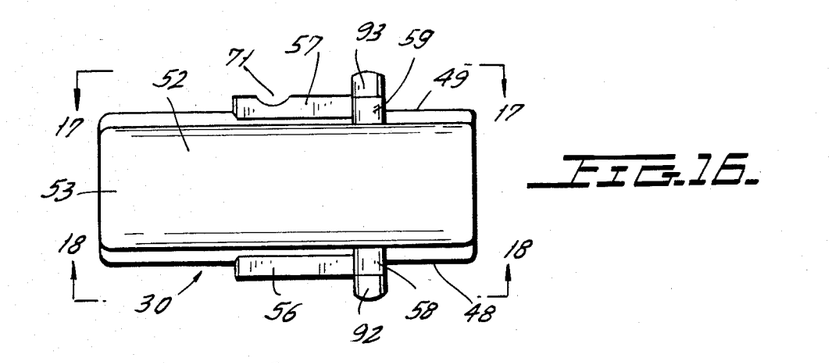
FIG. 16 is a bottom view of the molded insulating tube.
Figure 17:
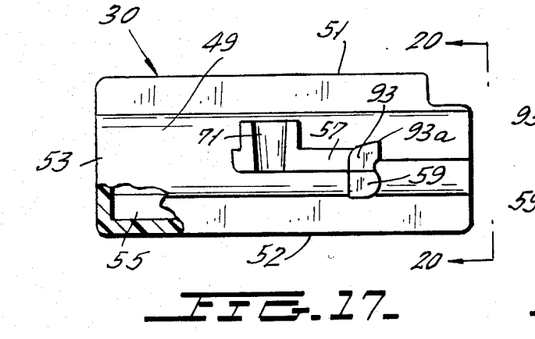
FIGS. 17 and 18 are side elevations of the insulating tube looking in the directions of the respective arrows 17—17 and 18—18 of FIG. 16.
Figure 18:
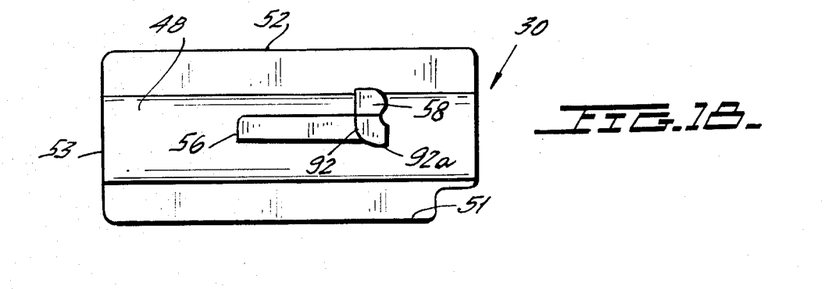
Figure 19:
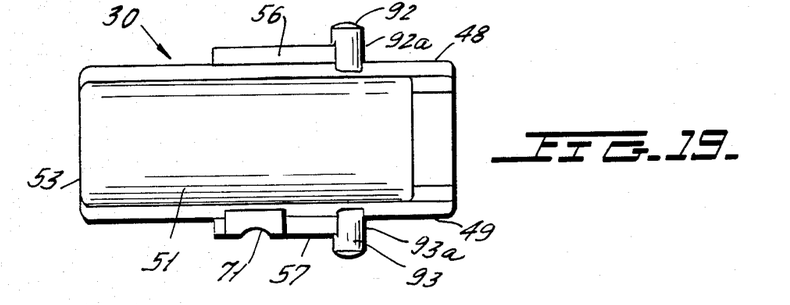
FIG. 19 is a top view of the insulating tube.
Figure 20:
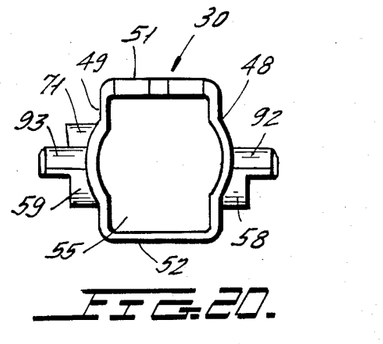
FIG. 20 is a front elevation of the insulating tube looking in the direction of arrows 20—20 of FIG. 17.

Two brush-holder assemblies 35 are mounted to spider 17 at diametrically opposite locations. A carbon brush 31 of each assembly 35 is biased radially inward against commutator 24 to provide a current path between an external energizing circuit and the windings of armature 23. In a manner known to the art, fan 32 is mounted to shaft 12 above spider 17 and directs air downward to cool armature 23 and the other motor elements. Cap 33 encloses cooling fan 32 and is removably mounted to spider 17 by extensions (not shown) that fit into spider depressions 34, and by having portions of cap 33 deflect and then snap back behind ledges 99 (FIG. 11) of spider 17.

As seen best in FIGS. 8 through 15, spider 17 includes raised central section 41 where upper bearing 15 (FIG. 5) is disposed, four diagonally extending, somewhat L-shaped arms 42, and two generally parallel connecting sections 43. Each connecting section 43 extends between the lower ends of two arms 42, and all four arms 42 have their upper ends connected to central section 41. A clearance aperture 19 is located at approximately the center of each connecting section 43. Generally radial guide walls 46, 47 of each connecting section 43 are disposed adjacent to opposite sides 48, 49 of insulating tube 30 (FIGS. 16-22) therebetween.

Insulating tube 30 (FIGS. 16-22) is an elongated molded plastic element whose sides 48, 49 are connected by generally parallel top and bottom walls 51, 52. Wall 53 closes the rear of chamber 55 that is defined by tube 30. The front of chamber 55 is open and the front end of top wall 51 is set back from the front end of bottom wall 52. Longitudinally extending indexing ribs 56, 57 project outward from the respective sides 48, 49. Axially aligned pivot formations 58, 59 also project outward from the respective walls 48, 49 and are disposed below the forward ends of ribs 56, 57 respectively. Projections 92, 93, which are longer than pivot formations 58, 59, constitute stabilizers that extend from the respective side walls 48, 49 and are disposed immediately above the respective pivot projections 58, 59. Pointed sections 92a and 93a of the respective stabilizers 92, 93 project above respective ribs 56, 57. Abutment 71 projects slightly above pointed section 93a of stabilizer projection 93.

Figures 21, 22, 24:
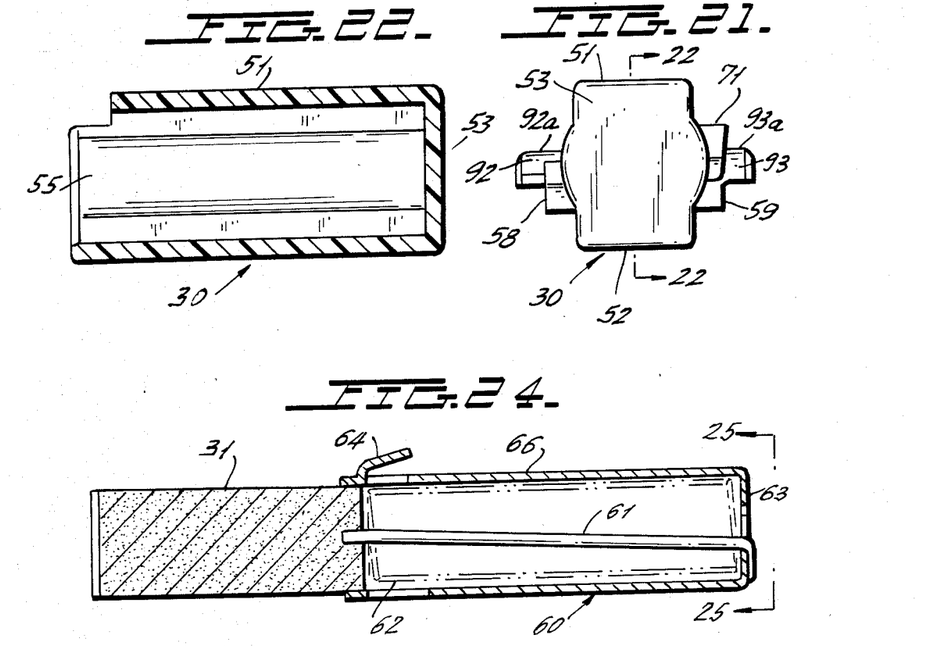
FIG. 21 is a rear elevation of the insulating tube.
FIG. 22 is a cross section taken through line 22—22 of FIG. 21 looking in the direction of arrows 22—22.
FIG. 24 is a longitudinal cross section of a brush and brush tube assembly.
Figure 23:
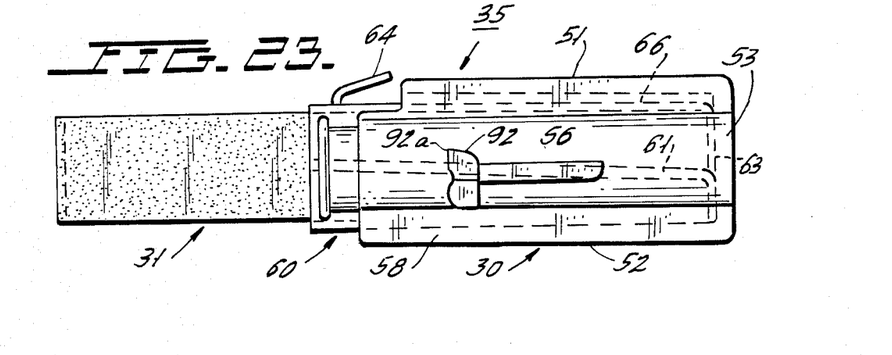
FIG. 23 is a side elevation of the brush-holder assembly, with the brush biasing spring (see FIG. 24) omitted to avoid cluttering.
Figure 25:
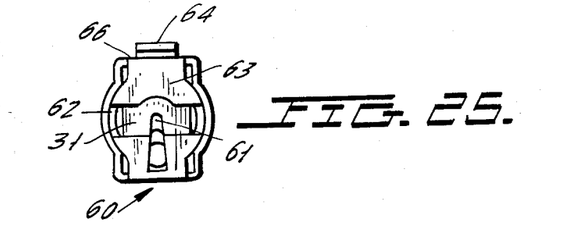
FIG. 25 is a rear elevation of the assembly of FIG. 24 looking in the direction of arrows 25—25 of FIG. 24.

Each brush 31 projects through the open front end of conducting brush tube 60 that is frictionally held within insulating tube 30 and is formed principally by bending a sheet metal element (FIGS. 23-25). Coiled compression spring 62 is disposed within brush tube 60 and bears against its generally closed rear wall 63 to bias brush 31 forward, or in a radially inward direction. Forward movement of brush 31 relative to brush tube 60 is limited by the length of flexible conductor 61 which extends lengthwise through spring 62 while having one end brazed to wall 63 and the other end fixedly connected to brush 31 at the rear thereof. Male plug-in terminal 64 is formed integrally with brush tube 60 and projects above upper wall 66 thereof. Typically, terminal 64 is engaged by a cooperating female type terminal (not shown) that is connected by a flexible conductor (not shown) to one end of a field coil (not shown) that is disposed on field stack 22 in a location known to the art so as to generate magnetic flux in a path that includes stack 22 and armature 23. With tubes 30 and 60 assembled, terminal 64 is disposed where the front of upper wall 51 is set back.

Brush-holder assembly 35 (FIG. 23) consists of insulating tube 30 combined with the elements of FIG. 24, namely, brush 31, spring 62, conductor 61, and conducting brush tube 60. Assembly 35 is installed in its lock-up or final operating position of FIG. 1 by introducing brush-holder assembly 35 to spider 17 at an angle of approximately 20° (FIG. 5) with respect to its lock-up position. Walls 46, 47 of spider 17 serve to position assembly 35 side to side as the latter moves radially inward. To bring assembly 35 to the oblique position of FIG. 5, bearing means formed by pivot projections 58, 59 and their associated stabilizer projections 92, 93, are entered into respective recesses 94, 95 in guide walls 46, 47, respectively, through entrances at the top rear of both recesses 94, 95. At this point, the bottoms of indexing ribs 56, 57 may rest against spider portions 97 at the rear ends of elongated recesses 96 that receive ribs 56, 57.

Figure 3:
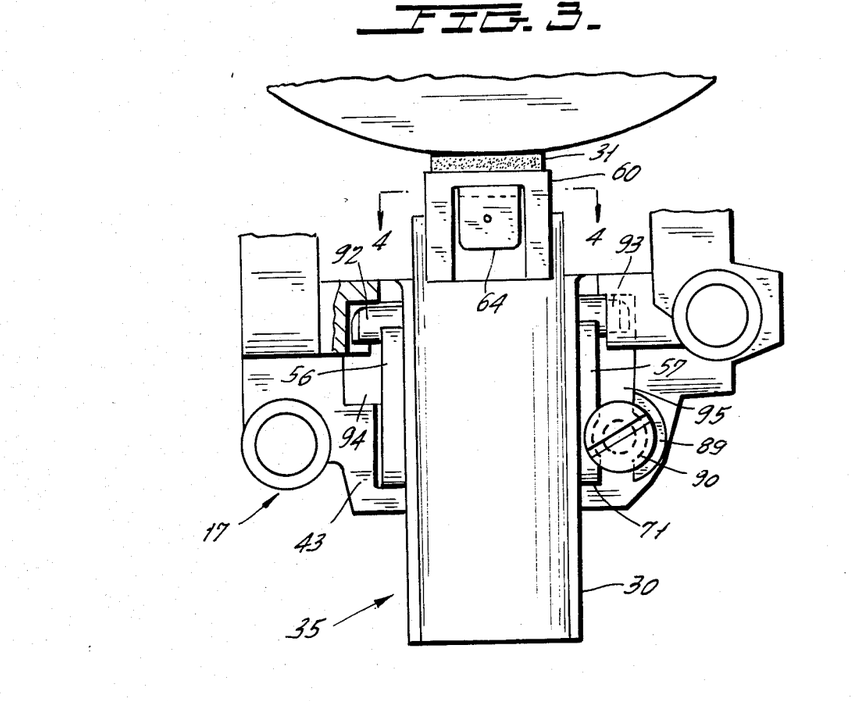
FIG. 3 is an enlarged fragmentary plan view of one brush holder and elements mounted thereto in their final operating position.
Figure 4:
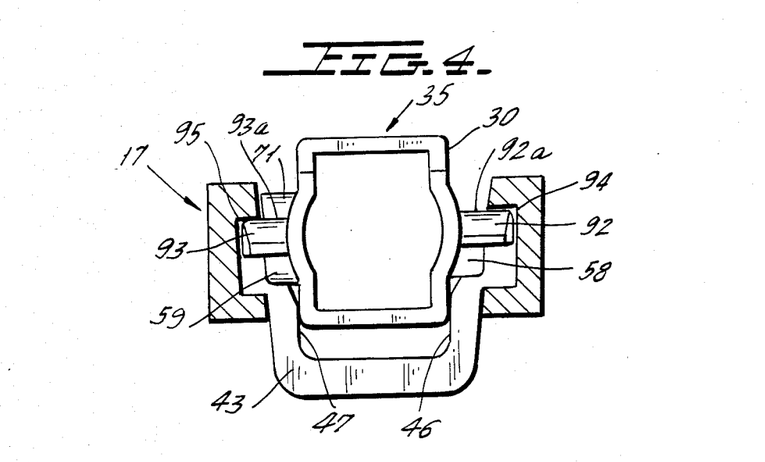
FIG. 4 is a front end view of the brush holder looking in the direction of arrows 4—4 of FIG. 3 to show the relationship between the bearing projections of the insulating tube and the bearing formations of the stationary frame.
Figure 6:
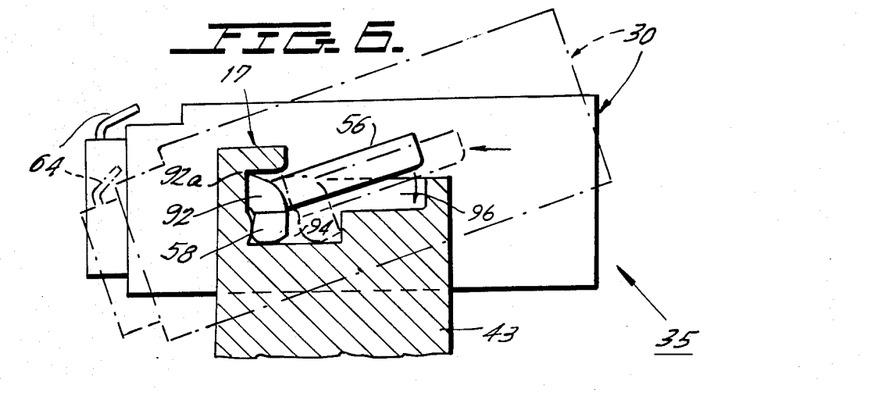
FIG. 6 is an enlargement to illustrate the pivotal movement of the brush-holder assembly during mounting thereof.
Figure 7:
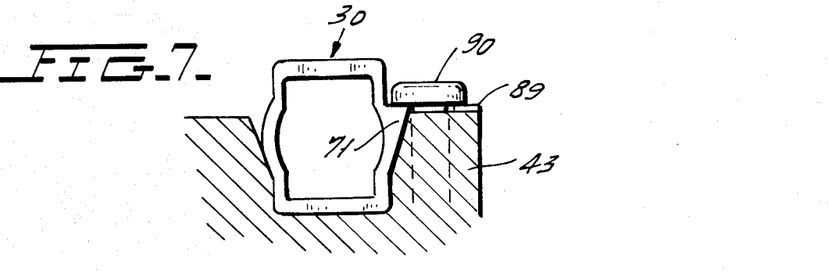
FIG. 7 is a detail showing the engagement between the insulating tube and the screw which locks the former in its final operating position.
Figure 8:
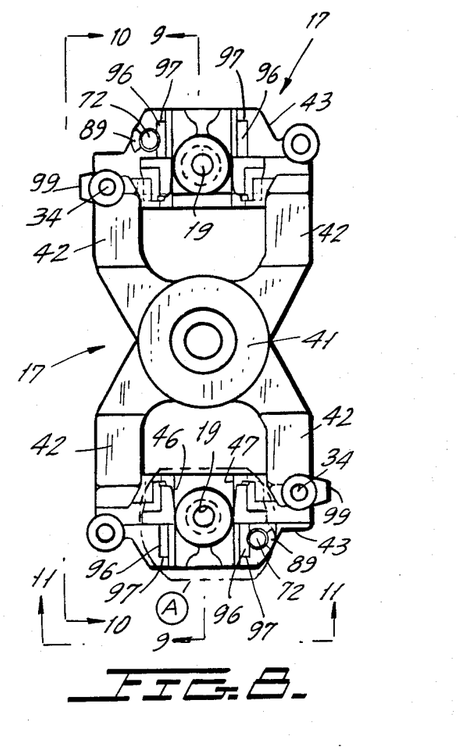
FIG. 8 is a plan view of the frame spider to which the brushes are mounted.
Figure 9:
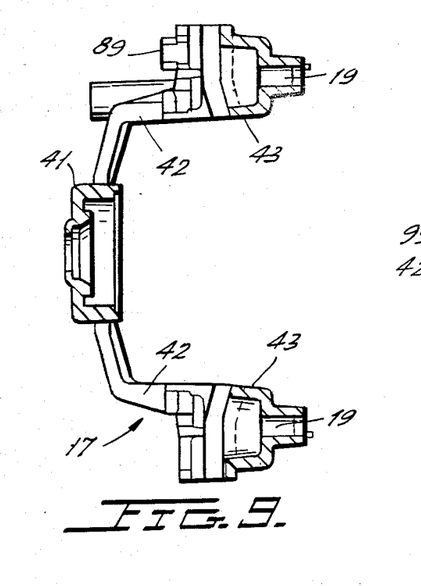
FIG. 9 is a cross section taken through lines 9—9 of FIG. 8 looking in the direction of arrows 9—9.
Figure 10:
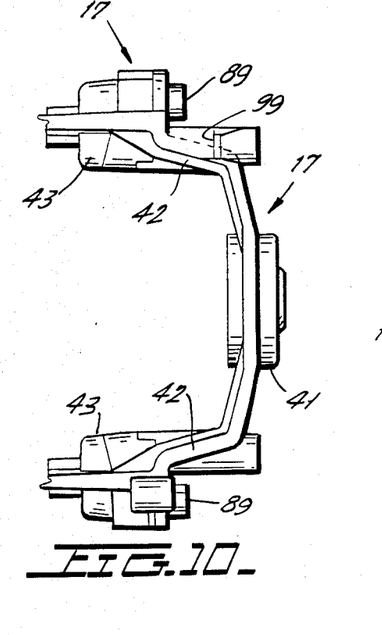
FIGS. 10 and 11 are side and end views, respectively, of the spider looking in the directions of the respective arrows 10—10 and 11—11 of FIG. 8.

With pivot projections 58, 59 disposed within recesses 94, 95, and brush 31 engaging commutator 24, assembly 35 is moved forward or radially inward, compressing spring 62. This movement continues until the bearing means formed by pivot projections 58, 59 engage the bearing formations formed by the front boundaries of recesses 94, 95. In this position (FIG. 6) of brush-holder assembly 35, the rear ends of ribs 56, 57 (FIG. 19) of tube 30 are slightly forward of spider portions 97 (FIG. 8). Assembly 35 is then pivoted clockwise with respect to FIG. 5 about an axis located at projections 58, 59, ribs 56, 57 are received by recesses 96 until pointed sections 92a, 93a of stabilizer projections 92 and 93 (FIGS. 3 and 16) make contact with upper walls of recesses 94, 95. At this point assembly 35 is still slightly oblique with respect to its lock-up position while ribs 56, 57 are disposed mostly within recesses 96. At this point radially outward movement of tube 30, induced by biasing spring 62, is limited by spider portions 97. Assembly 35 will remain in this position, unattended, until screw 90 is introduced. Now screw 90 is threaded into spider aperture 72 with the head of screw 90 engaging insulating tube 30 at the top of abutment 71. Further tightening of screw 90 forces assembly 35 from a slightly oblique position to its lock-up position. Thus further tightening of screw 90 generates a force that creates additional engagement of pointed sections 92a, 93a of stabilizer projections 92, 93 with upper walls of recesses 94, 95. This is a wedging action that serves to stabilize the forward end of tube 30. Screw 90 also blocks assembly 35 from pivoting counterclockwise. A stop formation provided by a spider abutment 89 adjacent aperture 72 is in the path for the head of screw 90 thereby limiting compression of tube abutment 71 by screw 90.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An electric motor including:
    an output shaft, frame means on which said shaft is mounted for rotation about a first axis, armature winding means on said shaft, commutator means on said shaft connected in circuit with said armature winding means, first and second brush-holder assemblies mounted on said frame means and in operative engagement with said commutator;
    each of said brush-holder assemblies including an insulating tube, a conducting brush disposed within said insulating tube with a first end of said brush extending through an open front end of said insulating tube, and spring means biasing said brush in a generally radial direction with respect to said first axis to drive said first end of said brush through said first end into operative engagement with said commutator means;
    each of said insulating tubes having a tubular axis extending in a generally radial direction with respect to said first axis and having bearing means defining a transverse pivot for said insulating tube, which pivot is transverse to said tubular axis, said frame means including first and second bearing formations that are operatively engaged by the bearing means of the respective first and second insulating tubes to cooperate therewith and define axes about which the brush-holder assemblies were pivoted into their final operating positions with respect to the frame means;
    with said brush-holder assemblies in their said final operating positions, the insulating tubes thereof being maintained against pivotal movement about said bearing means and otherwise being maintained in fixed positions relative to said frame means;
    first and second securing means on the frame for maintaining the respective first and second brush-holder assemblies in their said final operating positions;
    said securing means being in operative engagement with said brush-holder assemblies at locations radially outward of said bearing formations;
    each of said first and second securing means comprising a screw including a stem threadably engaged with said frame and a head that engages a different one of said insulating tubes.

2. An electric motor as set forth in claim 1 in which the front ends of said insulating tubes are radially inward of said bearing formations.

3. An electric motor as set forth in claim 1 in which said bearing means for each of said insulating tubes is formed integrally therewith and includes aligned first and second pivot sections that project transversely from opposite sides thereof.

4. An electric motor as set forth in claim 1 in which each of said first and second securing means is constituted by a single screw having a head that engages a different one of said insulating tubes.

5. An electric motor as set forth in claim 4 in which the head of each of said screws is in engagement with a respective one of said insulating tubes at a transverse projection thereof and the stem of each of said screws extends generally parallel to the first axis.

6. An electric motor as set forth in claim 5 in which the frame means is provided with stop formations that are engaged by said heads to control engagement of said heads with said transverse projections.

7. An electric motor as set forth in claim 1 in which the first and second bearing formations are disposed within respective first and second recesses in said frame means;
    each of said recesses having an entrance that is radially outward of the bearing formation within such recess;
    each of said recesses being defined partially by a wall extending from said entrance to said bearing formation; said wall being disposed and adapted to act as a guide along which said bearing means was slid along and directed into engagement with said bearing formation during assembly of said brush-holder assembly to said frame means.

8. An electric motor as set forth in claim 7 in which said frame means includes formation means adapted to cooperate with said brush-holder assembly to maintain the latter disposed obliquely with respect to its final operating position, during assembly of said brush-holder assembly to said frame means while said bearing means is moved in said recess from said entrance toward engagement with said bearing formation.

9. An electric motor as set forth in claim 8 in which for each of the insulating tubes the bearing means comprises aligned first and second sections at opposite sides of said insulating tube, with said sections including aligned relatively short bearing projections and aligned relatively long stabilizing projections; and
    said bearing projections and said recesses being adapted to cooperate so that as said brush-holder assembly is pivoted to its final operating position, said first and second sections of said bearing means become wedged against interior walls defining said recess.

10. An electric motor as set forth in claim 9 in which each of said stabilizing projections includes a relatively sharp edge that is wedged against said interior walls.

11. An electric motor as set forth in claim 1 in which each of said insulating tubes is provided with sidewise projections that are entered into locating depressions of said frame means and cooperate therewith to limit radially outward movement of said brush-holder assembly when the latter is in said final operating position.

12. An electric motor as set forth in claim 1 in which each of said brush-holder assemblies also includes a conducting brush tube interposed between said brush and said insulating tube.

13. An electric motor as set forth in claim 12 in which each of said brush-holder assemblies also includes a flexible conductor connecting at one of its ends to said brush and at its other end to said conducting brush tube.

14. An electric motor as set forth in claim 13 in which each of said brush-holder assemblies also includes a coiled compression spring constituting said biasing means;

said spring being disposed within said conducting brush tube and surrounding said conductor.

15. An electric motor as set forth in claim 14 in which each of said brush-holder assemblies also includes a plug-in terminal for connecting said brush in a motor energizing circuit;

said plug-in terminal being integrally formed with said conducting brush tube.

16. An electric motor as set forth in claim 10 in which each of said brush-holder assemblies also includes a plug-in terminal for connecting said brush in a motor energizing circuit;

said plug-in terminal being integrally formed with said conducting brush tube.

* * * * *

UNITED STATES PATENT AND TRADEMARK OFFICE
CERTIFICATE OF CORRECTION

PATENT NO. : 4,800,312

DATED : January 24, 1989

INVENTOR(S) : Rudolph W. WACEK et al.

It is certified that error appears in the above-identified patent and that said Letters Patent is hereby corrected as shown below:

Claim 1, column 5, line 43,
correct "first" to --front--.

Signed and Sealed this

Eighteenth Day of September, 1990

Attest:

HARRY F. MANBECK, JR.

*Attesting Officer*  *Commissioner of Patents and Trademarks*